(12) United States Patent
Yamanoi

(10) Patent No.: US 8,000,997 B2
(45) Date of Patent: Aug. 16, 2011

(54) METHOD FOR SETTING IMAGE FOR STANDARD OPERATING SPEED, AND METHOD FOR FINDING EVALUATION VALUE WITH IMAGE OF EVALUATION SUBJECT DATA BASED ON STANDARD OPERATING SPEED

(76) Inventor: Yoshiaki Yamanoi, Tokyo (JP)

( * ) Notice: Subject to any disclaimer, the term of this patent is extended or adjusted under 35 U.S.C. 154(b) by 1389 days.

(21) Appl. No.: 10/521,554

(22) PCT Filed: Jul. 9, 2004

(86) PCT No.: PCT/JP2004/010158
§ 371 (c)(1),
(2), (4) Date: May 8, 2006

(87) PCT Pub. No.: WO2005/006095
PCT Pub. Date: Jan. 20, 2005

(65) Prior Publication Data
US 2006/0212342 A1    Sep. 21, 2006

(30) Foreign Application Priority Data
Jul. 9, 2003   (JP) ................................ 2003-272627

(51) Int. Cl.
*G06Q 10/00* (2006.01)

(52) U.S. Cl. ...................... 705/7.42; 348/446

(58) Field of Classification Search ................ 705/7, 11, 705/7.42; 348/446
See application file for complete search history.

(56) References Cited

U.S. PATENT DOCUMENTS

| | | | | |
|---|---|---|---|---|
| 4,461,553 A * | 7/1984 | Doerr et al. | ...................... | 352/39 |
| 4,505,559 A * | 3/1985 | Prinz | .................. | 396/8 |
| 5,678,067 A * | 10/1997 | Kitagawa et al. | ............... | 396/55 |
| 5,768,122 A * | 6/1998 | Motoc | ............. | 700/50 |
| 5,978,600 A * | 11/1999 | Takeuchi et al. | ................ | 396/53 |
| 6,445,882 B1 * | 9/2002 | Hirano | ............................ | 396/52 |
| 6,570,624 B2 * | 5/2003 | Cornog et al. | ................ | 348/446 |

FOREIGN PATENT DOCUMENTS

| JP | 10301472 A * | 11/1998 |
|---|---|---|
| JP | 2001014016 A * | 1/2001 |
| JP | 2002312017 A * | 10/2002 |

* cited by examiner

*Primary Examiner* — Johnna R Loftis
(74) *Attorney, Agent, or Firm* — Stites & Harbison PLLC; Douglas E. Jackson; Stephen J. Weyer

(57) ABSTRACT

This invention relates to a method of establishing, by means of images, a standard working speed of working steps including a plurality of different motion elements, and a method whose object is that working same as said working steps is carried out by different workers to obtain an image of the working step of evaluation object, and it is expressed with numerical value as an evaluation value to what extent the image of the working step of said evaluation object is speedy (or slow) relative to the image of said established standard working speed.

4 Claims, 3 Drawing Sheets

METHOD FOR SETTING IMAGE FOR STANDARD OPERATING SPEED, AND METHOD FOR FINDING EVALUATION VALUE WITH IMAGE OF EVALUATION SUBJECT DATA BASED ON STANDARD OPERATING SPEED

FIELD OF THE INVENTION

This invention relates to a method for establishing, with image, a standard working speed of the working step including a plurality of different motion elements. This invention also relates to a method in which a working same as said working step, is performed by a different worker to obtain an image of the working step to be evaluation object and the image of the working step to be the evaluation object is expressed with numerals as an evaluation value as to how said image has become speedy (or delayed) relative to the image of said established standard working speed.

BACKGROUND OF THE INVENTION

As the background technique there can be mentioned a method and a system disclosed in Japanese Patent Kokai No. 2001-14016 filed in the name of the same inventor as in the present application. Said technique discloses the following matters:

Analysis of motion elements of working steps;
Optional establishment of speed magnification per each of the analyzed motion elements;
Possible regeneration of respective motion elements by optional magnification;
Possible indication of speed of the regenerated result based on numerical values;
Possible registration of the motion content, with letters, per each of the analyzed motion elements;
Possible deletion of unnecessary motion elements in response to the analyzed motion elements; and
Possible simulation by image in a state where unnecessary motion elements have been deleted and the display magnification has been set for each of the motion elements.

That is, the ealier invention relates to a technique of a system and a method in which basis motions are made possible as an analysis system. Said technique has enabled the motion elements to be analyzed and retained and the data to be freely processed whereby more fine settings can be carried out at a short time.

However, in order to establish a movie at the standard working speed, which is one of the objects of the present invention, there is no alternative as before but to rely on rich experience and knowledge i.e. on the analyzer,s faculties. Under the circumstances it has so far been desired to create a method of establishing movies of suitable standard working speed even without rich experience and knowledge.

By the way, in the case of improper standardization of the working speed the following problem occurs:

For example, in case a low working speed is to be set as a standard it is possible to achieve a working speed by more than 200% relative to the movie of said determined standard working speed if the worker makes efforts a little.

Thus, in case a more than 200% working speed is obtained relative to a simple standard value, the establishment of the standard working speed is not basically suitable, so that a trouble is brought about for production planning or the profit is lessened. On the other hand, in case the standard working speed is set conversely high, the worker gets great fatigue only to retain a 100% working speed whereby the worker's health may be injured.

In addition, one more reason of hindering proper setting of the standard working time is that at sampling the worker is likely to act intentionally as if the standard working speed is slower. This makes it likely that the standard working time (speed) comes off the original value.

It is one object of the present invention to try to obtain an image of a suitable standard working speed even if such an unnatural act is included in sample and the observer has no deep experience for the standard working time.

Further, one more object of the invention is to evaluate quickly and with numerical values to what extent the image of intended evaluation object data is doing a speedy (retarded) working relative to the movie of said suitable standard working speed.

DISCLOSURE OF THE INVENTION

This invention aims at inspecting the standard working speed by simulating the maximum speed realizable by the worker. This invention also aims at obtaining a movie of more suitable standard working speed quickly even without specific experience by simulating the maximum speed realizable by the worker on whether a tentatively determined standard working speed is proper or not. Further, according to the invention, the movie of the proper standard working speed thus obtained is operated together with the image of the intended evaluation object data whereby the movie of the proper standard working speed is varied at regeneration speed preferably with a continuous mode to bring both the move and image into agreement. Under such agreed condition the movie of the proper standard working speed is calculated as to what extent it is magnified, and it is intended to quickly obtain the evaluation value of the evaluation object data.

To satisfy said requirement the method of establishing the movie at the standard working speed of the invention comprises the following steps:

Step (s1a)

The data where the motion elements relied on human working speed are. observed as moving images are made a first kind of motion elements. The data where the motion elements relied on machine speed are observed as moving images are made a second kind of motion elements. The continuous working including said first kind of motion elements and said second kind of motion elements is made a working step, and said working step is stored in computer as digital data.

Step (s1b)

In this working step said first kind of motion elements and said second kind of motion elements are analyzed and the analyzed result is stored as digital data.

Step (s1c)

An optional accelerating number (x) is multiplied relative to said first kind of motion elements to obtain the accelerated first kind of motion elements.

Step (s1d)

The accelerated first kind of motion elements and second kind of motion elements are coupled to obtain movies of accelerated working step.

Step (s1e)

The images obtained in the step (s1d) are confirmed that they are at maximum speed as human motions.

Step (s1f)

Said first kind of motion elements multiplied to the maximum speed confirmed in the step (s1e) is multiplied by decelerating constant (r) previously set thereby obtaining standardized first kind of motion elements.

Step (s1g)

The standardized first kind of motion elements and second kind of motion elements are coupled thereby obtaining the images of the standardized working step.

Further, a method of establishing, though the same desire, movie at standard working speed according to another aspect of the invention comprises the following steps:

Step (s2a)

The data where the motion elements relied on human working speed are observed as moving images are made a first kind of motion elements. The data where the motion elements relied on machine speed are observed as moving images are made a second kind of working elements. The continued working including said first kind and second kind of motion elements is made a working step, and this working step is stored in computer as digital data.

Step (s2b)

In this working step said first kind of motion elements and said second kind of motion elements are analyzed, and the analyzed result is stored as digital data.

Step (s2c)

An optional standardizing number (s) is multiplied relative to said first kind of motion elements to obtain tentatively standardized first kind of motion elements.

Step (s2d)

Said tentatively standardized first kind of motion elements are coupled with said second kind of motion elements so as to obtain moving images of the tentatively standardized working step.

Step (s2e)

The tentatively standardized first kind of motion elements are multiplied by a previously set, fixed accelerating number (z) so as to obtain a first kind of accelerated motion elements.

Step (s2f)

Said first kind of accelerated motion elements are connected to the second kind of motion elements, whereby moving images of the accelerated working step are obtained.

Step (s2g)

The moving images obtained in the step (s2f) are confirmed that they are at maximum speed as human motion.

Step (s2h)

The sufficiency and insufficiency clarified in the step (s2g) are repeatedly obtained up to maximum speed in the step (s2g) by varying an optional standardizing number (s) whereby said standardizing number (s) is determined.

Step (s2i)

The standardizing number (s) determined in the step (s2g) is multiplied by the first kind of motion elements, and the first standardized motion elements are connected to the second kind of motion elements so that the moving images of the standardized working step are obtained.

Furthermore, a method of judging how the movie at unknown working speed is speedy (delayed) relative to the standard working speed, based on the movie at the standard working speed comprises the following steps:

Step (s3a)

The data where the working content same as in said working step and by a different worker is displaced as moving images are stored as digital data, and these data are made evaluation object data.

Step (s3b)

Said evaluation object data are displayed as moving images on a display unit of a computer.

Step (s3c)

Movie at the standard working speed is displayed on the picture same as the image of said evaluation object data.

Step (s3d)

Evaluation value composed of optional numerical value is multiplied relative to the first kind of motion elements included in said standard working speed, and said elements are cooperated with the second kind of motion elements thereby to obtain the moving images of quickly evaluated working step.

Step (s3e)

The images of said evaluation object data are compared with the images of the evaluated working step, and said evaluation value is varied until the speed becomes the same in the same situation of the first kind motion elements.

Step (s3f)

Said evaluation value is displayed at the time when the speed has become the same in step (s3e).

BEST MODE FOR CATTYING OUT THE INVENTION

The invention will now be described more in detail, by way of embodiments, with reference to the accompanying drawings.

Figure 1:
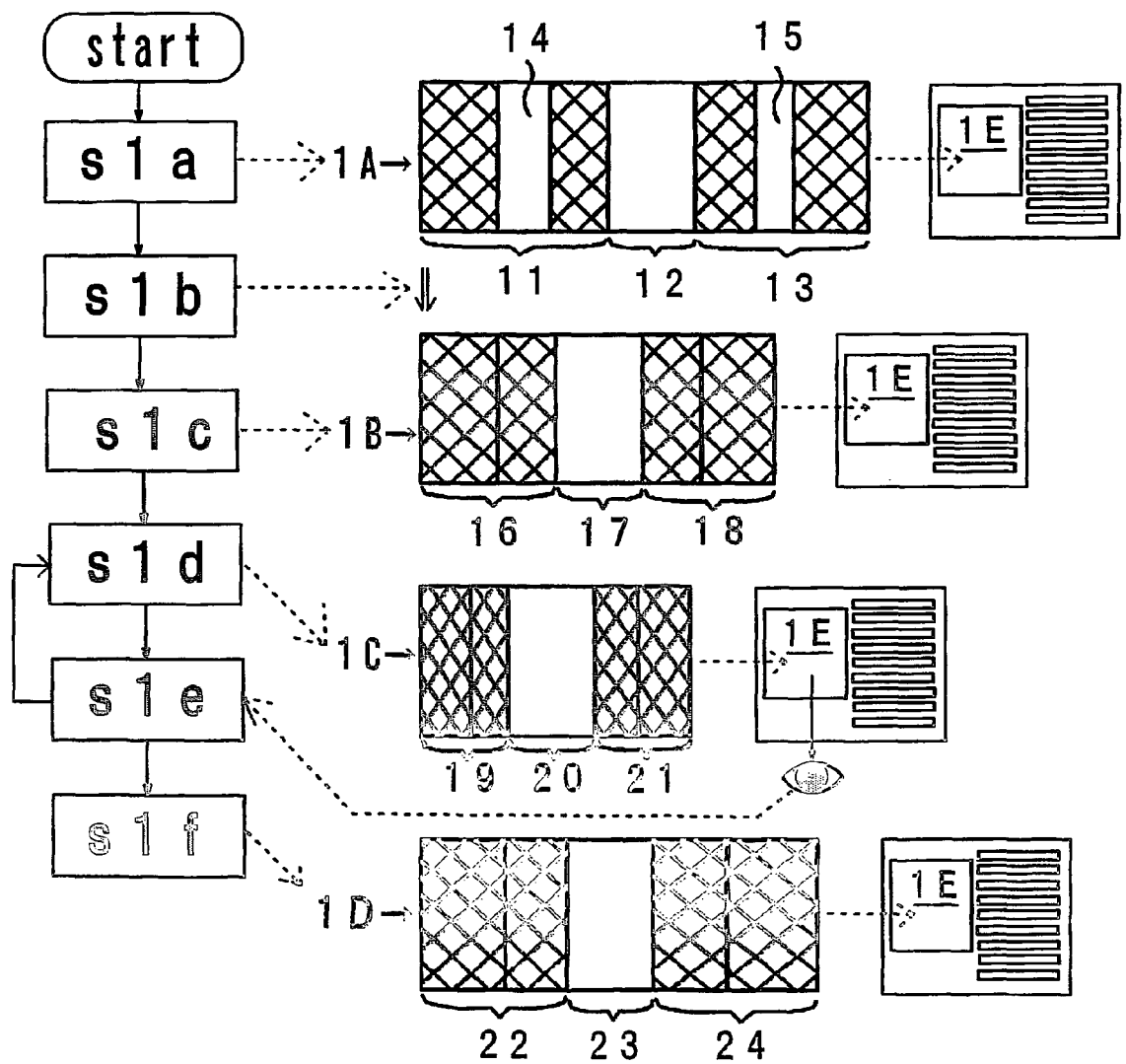
FIG. 1 is an explanatory chart that shows the working steps of a first embodiment.

FIG. 1 is an explanatory chart showing the working steps of a first embodiment.

In FIG. 1, the left vertical row is a flow chart showing the method of the invention, the middle vertical row shows files of movie data made up in said procedures, and the right vertical row shows a state where the files of said movie data are shown on the display of computer.

Further, file 1A is a datum for sample movie of unprocessed working step, and step (s1a) is a step for having said file 1A stored in the user's computer.

Said working step includes a plurality of first kind of motion elements replied on human working speed and a second kind of single motion element relied on machine speed. Moreover, the data of separating the first kind of motion elements from the second kind of motion element are not recorded in advance. However, the movie datum for said file 1A is composed of three kinds of motion elements (movie data).

In step (s1b), the user makes an analysis while observing the movie of said separation-free file 1A, when the user finds initiating datum of a single motion element based on said analyzed result, and at the filing time the initiating records are stored in computer, and then by finding the finish of said motion element the finish data are recorded in the computer.

In respect of the whole data for the moving images of said file 1A, said operation is repeated to record in the computer the information on start and finish per motion element. These data are finally recorded as data associated with said file 1A.

Further by the moving image re-producing program software that utilizes said data and that is installed in the user's computer, it becomes possible, on the computer, to reproduce, skip, stop, reproduce at high speed, reproduce at low speed, reversely reproduce as necessary the file 1A. For example, if the movie of said analyzed result is reproduced in entirety at equal speed with processing it the movie becomes the same as in 1A.

A first kind of motion element 11, one of said three motion elements to be said analytical object, is a motion element up to gripping or holding a bolt and fixing it to a power tool, and this motion element relies on human working speed.

Said first kind of motion element 11 includes an erroneous motion element 14 in which the holding bolt is dropped.

A second kind of motion element 12, second one of said three motion elements, is a motion element in which said bolt is rotated by the power tool so as to be mounted to a predetermined base plate, and this motion element relies on machine speed.

A first kind of motion element 13, third one of said three motion elements, is such one that said base plate mounted with said bolt is taken out of said power tool so as to be stored in a predetermined box. This motion element relies on human working speed.

Said first kind of motion element 13 includes an erroneous motion element 15 where the installation direction of the box must be changed manually by the worker because of incorrect direction of the box by belt conveyor.

Step (s1c) is the one for removing the erroneous motion element in said analyzied motion elements. That is, the erroneous motion element 14 is removed from the first kind of motion element 11, and the resulting movie data become a first kind of motion element 16. Further, the second kind of motion element 12 is equimultipled and the resulting data for movie become a second kind of motion element 17. Furthermore, the erroneous motion element 15 is cancelled from the first kind of motion element 13 and the resulting data for movie become a first kind of motion element 18.

The first kind of motion element 16, the second kind of motion element 17 and the first kind of motion element 18 which are obtained from the results of the above steps, become continued moving image data. These data become movie data of file 1B, and it is possible to observe the state in which the error motion elements have been deleted by display 1E by means of said moving image reproducing program software.

Step (s1d) is a step in which an optional accelerating number (x) is multiplied relative to the motion elements 16 and 18 where the speed is varied in the motion elements of file 1B, and it is tried to make the movements of the first kinds of motion elements 16 and 18 to be realizable maximum speed. The second kind of motion element whose speed is not varied is equimultipled, namely it is processed as data of the same speed.

To explain the motion elements respectively, said first kind of motion element 16 is accelerated with magnification of the accelerating number (x) thereby resulting in a first kind of motion element 19. Similarly, said first kind of motion element 18 is accelerated with magnification of the accelerating number(x) thereby resulting in a first kind of motion element 21. Said second kind of motion element 17 changes to a second kind of motion element 20 without changing the reproducing speed.

The image data of the first kind of motion element 19, the second kind of motion element 20 and the first kind of motion element 21 obtained in said step (s1d), become a series of movie data. These movie data are file 1C, and it is possible to confirm whether said file 1C is at maximum speed observable by the user on display 1E by means of said moving image reproducing program software. This confirmation step is step (s1e).

In the confirmation step of step (s1e), if judgment is made to be slow or fast beyond the realizable maximum speed, a feedback is carried out to increase or decrease the magnification of the accelerating number (x) tentatively set in step (s1d).

Said feedback is stopped in the state where a new accelerating number (x) is set, said step (s1d) and step (s1e) are again processed, and it is confirmed that in said step (s1e) the speed has reached its realizable maximum. At said stopped time the magnification of the accelerating number (x) is determined. Therefore, the first kind of motion element 16 is accelerated to x times at said time to become a first kind of motion element. The second kind of motion element 17 is equimultiped to change to the second kind of motion element 20. Then, the first kind of motion element 18 is accelerated to said x times thereby to change to a first kind of motion element 21.

In step (s1f), the decelerating constant (r) set in advance is multiplied to the first kind of motion element 19, and the resulting moving image data become a first kind of motion element 22. Said first kind of motion element 22 is determined as the standardized speed. The second kind of motion element 20 is equimultipled to become a second kind of motion element 23. Further, the first kind of motion element 21 multiplies the decelerating constant (r) set in advance, and the resulting image data become a first kind of motion element 24. Said element 24 determines the standardized speed. The movie data of file 1D are formed by said first kind of motion element 22, said second kind of motion element 23 and said first kind of motion element 24. Then, it is capable of observing said file 1D on display 1E by means of said moving image program software, and the images become the movie at the standard working speed. In addition, said decelerating constant (r) is to decelerate the speed from realizable maximum speed to a standard speed and it is established in advance. For example, said decelerating constant (r) can take the value in the range 0.62 to 0.58, and basically it is previously determined as a fixed value. This numeral value is of magnification aiming that the realizable maximum speed (continuable, possible-laboring maximum working speed) comes within the range 160% to 170% in case the standard speed is made 100%.

Figure 2:
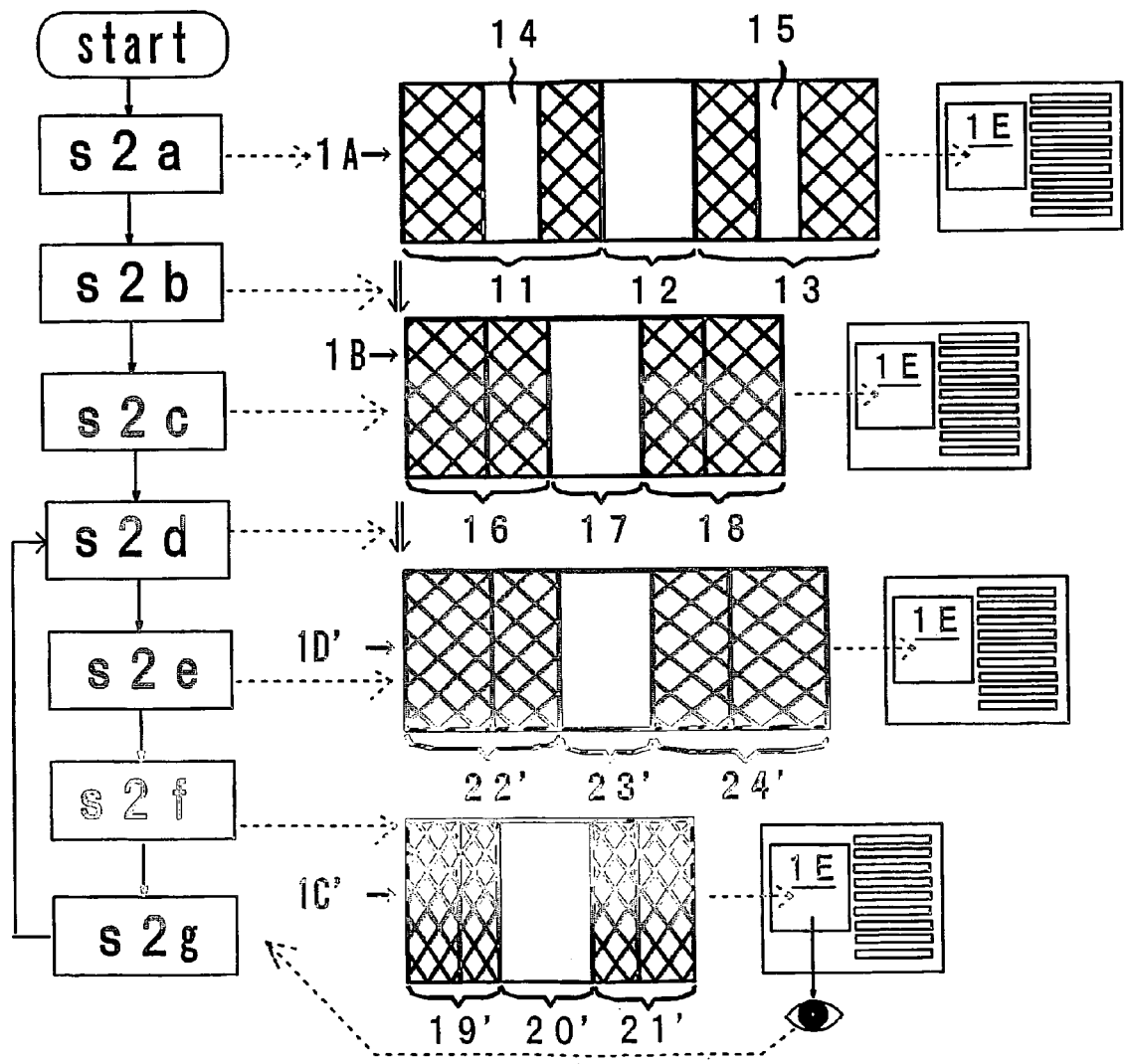
FIG. 2 is an explanatory chart that shows the working steps of a second embodiment.

FIG. 2 is an explanatory chart showing the working steps of a second embodiment. In the drawing, the left vertical row is a flow chart showing the method (second invention) of the present invention, the middle vertical row shows a file of movie data made up by said procedures, and the right vertical row shows the states where the file of said movie data are displayed in computer.

Further, file 1A shows sample movie data of one working step not yet processed, and step (s2a) in the chart is to store said file 1A in the user's computer.

Said working step includes a plurality of first kind of motion elements relied on human working speed, and a second kind of single motion element relied on machine speed. In addition, the data showing the partition between the first kind of motion element and the second kind of motion element are not recorded in advance. However, as described above, the movie data of said file 1A are composed of three kinds of motion elements (movie data).

In step (s2a) the user analyzes the moving images of said partition-free file IA while observing them, the user finds the initiation image of one motion element based on said analyzing result to record in the computer the record of start at the finding, and then the user finds that the same motion element has finished whereby the finish data are stored in the computer. By repeating said operation the whole image data of said file 1A are recorded in the computer as information on start and finish for each motion element. These data are recorded finally as the data associated with said file 1A.

Moreover, by the moving image reproducing program software in which said data are utilized and installed in the user's computer, it becomes capable of, in order, reproducing, skipping, stopping, reproducing at high speed, reproducing at low speed and reproducing in reverse direction as necessary the file 1A on the computer. For example, if the whole images of the analyzed result are reproduced at equal speed without processing them, they become the same as in 1A.

The first kind of motion element 11, one of said three motion elements, is a motion element until the bolt is held and fixed to a power tool, and this motion element is one which relies on human working speed.

Said first motion element 11 includes the erroneous motion element 14 in which a holding bolt has dropped.

The second kind of motion element 12, one of the second of said three motion elements, is a motion element that relies on the speed of the machine in which the power tool rotates said bolt to mount it to the previously determined base plate.

The first kind of motion element 13 to be the third of said three motion elements is a motion element that relies on human working speed in which said base plate mounted with said bolt is taken out of said power tool so as to be stored in the predetermined box.

Said first kind of motion element 13 includes the erroneous motion element (movie data) 15 in which the installation direction of the box need be manually changed by the worker because of incorrect placing direction of the box transferred by a belt conveyor.

Step (s2c) is a step for removing the erroneous motion element in said analyzed motion elements. That is, the error motion element 14 is removed from the first kind of motion element 11, and the resulting image data become the first kind of motion element 16. Further, the second kind of motion element 12 is equimultipled and the resulting movie data become the second kind of motion element 17. Furthermore, the erroneous motion element 15 is cancelled from the first kind of motion element 13, and the resulting movie data become a first kind of motion element 18.

The first kind of motion element 16, the second kind of motion element 17 and the first kind of motion element 18 which are obtained as the results of the above steps, constitute a series of moving image data. These data become the move data of file 1B, and it is possible to observe a state of the cancelled erroneous motion element, by display 1E by means of said moving image reproducing program software.

Step (s2d) is one in which the optionally, tentatively determined standardizing number (s) is multiplied relative to the first kind of motion elements 16 and 18 whereby the motions of said elements 16 and 18 are tried to allow them to be speed directly standardized. The non-speed-changing second kind of motion element is equimultipled, that is, the same data are passed therethrough. Further, a first standardization is carried out to said first kind of motion element 16 with the magnification of the standardizing number (s), resulting in a first kind of motion element 22'. Similarly, a first standardization is carried out to said first kind of motion element 18, too, with the magnification of the standardizing number (s) so as to regulate the reproducing speed of the movie data to a first kind of motion element 24'. Said second kind of motion element 17 is transferred to a second kind of motion element 23' without changing the reproducing speed.

Step (s2e) is a step in which. file 1D' can be observed as moving images on display 1E by means of said moving image reproducing program software said file ID' being formed as a single moving image data unit by said first kind of motion element 22', said second kind of motion element 23' and said first kind of motion element 22'.

Step (s2f) and step (s2g) are steps for confirming whether the file ID' of the tentatively standardized movie data in said step (s2e) stores the movie data of accurate standard working speed.

Firstly, in step (s2f), a fixed accelerating number (z) set in advance in said first kind of motion element 22', is multiplied thereby to obtain an accelerated first kind of motion element 19', a second kind of equimultipled motion element 20' in the second kind of motion element 23', said accelerating number (z) is multiplied to a first kind of motion element 24' thereby to obtain a first kind of accelerated motion element 21', and said three data are obtained as a file IC' where they can be observed as a series of images.

Secondly, step (s2g) is to confirm whether file IC' is at realizable maximum speed capable of being observed by the user on display 1E by means of said moving image program software. Further, in case file IC' is judged not to be at realizable maximum speed in this step, in said step (s2d), the numerical value of said multiplied standardizing number (s) is changed relative to the first kind of motion elements 16, 18 where the speed can be changed in the motion elements of file 1B whereby the steps from the step (s2d) to the step (s2g) are carried out, and in the step (s2g) the working is repeated until it can be confirmed that the file 1C' is at realizable maximum speed. Then, at the time when it is at realizable maximum speed the optionally, tentatively determined standardizing number (s) is determined as a formal standardizing number (s). As a result, a series of moving image data consisting of the first kind of motion element 22', the second kind of motion element 23' and the first kind of motion element 24' which are obtained by said formal standardizing number (s) can be obtained as standardized image data. Further, said data correspond to file 1D'. Then, the images in which said file ID' is processed by means of said moving image reproducing program software and which is pictured on the display 1E, correspond to the images of the standard working speed.

Figure 3:
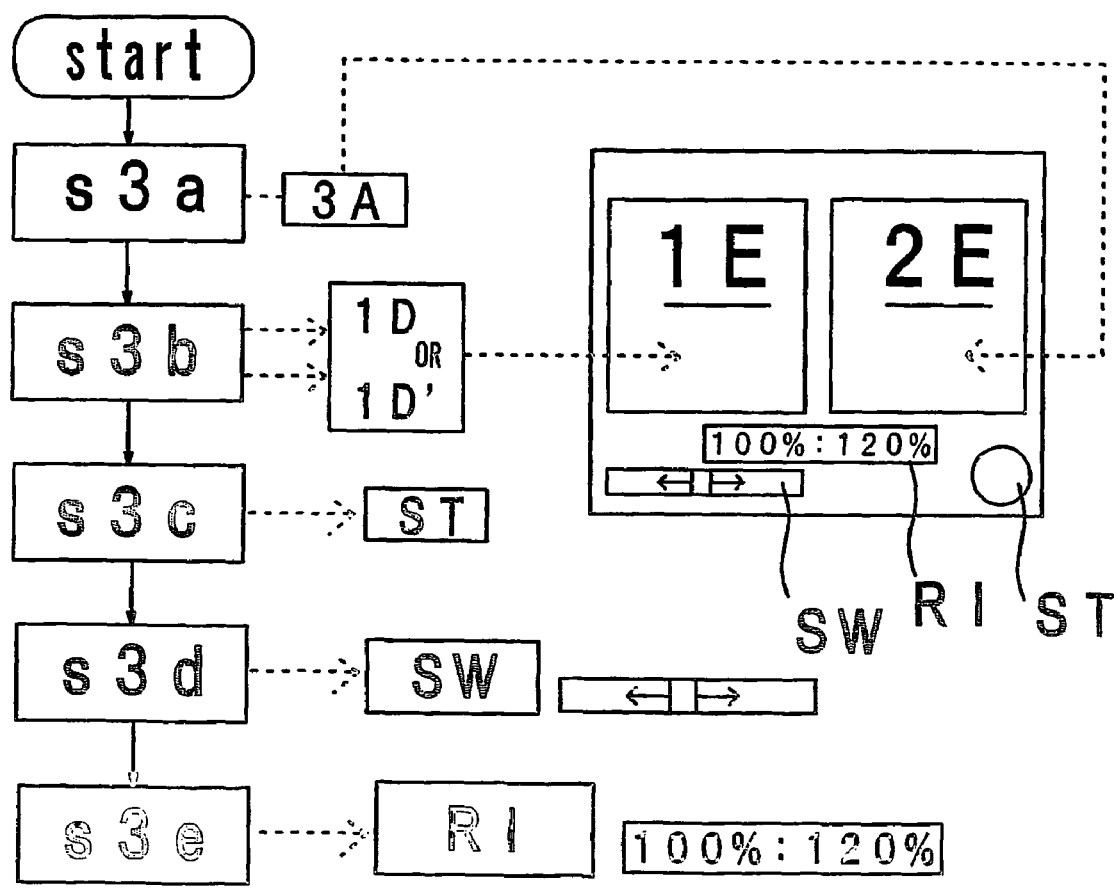
FIG. 3 is an explanatory chart that shows the working steps of a third embodiment.

FIG. 3 is an explanatory chart showing the working steps of a third embodiment. The left vertical row in the drawing is a flow chart showing the method (third invention) of the present invention, and the middle vertical row shows a state where a file of image data is displayed on computer.

Step (s3a) is the working step same as file 1A, it is a step for taking the image data (hereinafter called evaluation data) worked by the worker of evaluation object, and the image data thus taken are shown as file 3A.

Said file 3A is data which can be reproduced by means of the moving image reproducing program software of computer.

In the third embodiment, said set moving image reproducing program software is different from the moving image reproducing program software described in the first embodiment or the second embodiment in that the moving image reproducing zone is provided in such a manner that it can be simultaneously displayed at the two places of 1E and 2E.

In the data of said file 3A the imaging is started in the right side moving image reproducing zone 2E by pressing the start button. This start button is instructed by, for example, the mouse of the computer.

Step (s3b) is a step for referring to the data of either file 1D or 1D' of the image data of the standard working speed obtained in embodiments 1 and 2, and it selects either 1D or 1D'. For example, in case only file 1D is obtained selection is not needed so that file 1D is utilized. Further, in case the image of the standard working speed is already obtained by other means, the image data of the standard working speed already determined are utilized. Thus, the working of selecting the image data of the standard working speed is not particularly important step in this embodiment. In short, this step is to determine the image data of a suitable standard working speed.

Step (s3c) is a step that in the arranged states of both the files of step (s3a) and step (s3b) the imaging of both the files is started by pressing the start button ST.

Pressing the start button ST will display the image of the standard working speed in the left side moving image reproducing zone 1E, and at the same time the image for evaluation data will be displayed in the right side moving image reproducing zone 2E. Immediately after the starting the images of both the moving image reproducing zones 1E and 2E show the same images approximately at the same timing, but with time the two images shift.

Step (s3d) is a step for adjusting the shifting of said images by a slide switch SW disposed below said moving image reproducing zone. Said slide switch SW is designed to be operated by an arrow-marked button installed usually in the keyboard of the computer or by mouse. If it sides to the right the reproducing speed of the image of the image data 1E of said standard working speed is accelerated while if it slides to the left that reproducing speed is delayed. Said speed can be controlled without step, and the control is possible up to 200% in the high speed side and up to 50% in the low speed side. Further, a rating indication part RDP is arranged immediately above the slide switch SW. The rating indication part RDP is an indication frame for evaluating of what extent level the moving image reproducing zone 2E to be speed of unknown number is, if the speed of said moving image reproducing zone 1E is 100%. Materially, the speed of the image data 1E is changed by the slide switch SW, the rate is displayed, for example, as 120% at the right, and 100% at the left does not change in display. For example, if the image of the evaluation data is more speedy than the image of the standard working speed, the image is gradually slid to the moving image reproducing zone 2E of the evaluation data until the moving images agree. In the state of the slide switch SW as it is in agreement, both the image data are started again and it is preferable to confirm at least one time whether the two speeds are at the same level.

In step (s3e), the evaluation value "120%" displayed in the rating indication part RDP is read when said confirmation is made. Otherwise the data of the evaluation value described in the rating indication part RDP are recorded in the computer. In this third embodiment, an evaluation value has been obtained that based on 100% standard working speed the movie of the evaluation object data is 120%.

To add, in said step (s3a), the taken file 1A may be adapted such that as in the embodiments 1 and 2, partition is fixed the respective motion elements as necessary so that the respective motion elements can be controlled for reproduction. Doing that may cost labor for analysis of the motion elements but since it is possible to make a comparison with the movie of the standard working speed while taking synchronization for the respective motion elements more accurate evaluation will be obtained.

Referring to files 1A to 1D' composed of the image data constituted in the respective steps of the embodiments 1 to 3 in said explanation, different image data can be prepared for the respective steps. On the other hand, referring to the initial file 1A it is possible that data are established to separate the first kind of motion elements, the second kind of motion element, non-required motion elements, etc., a reproducing speed is established for each data and with regard to the non-required motion elements, they are provided with such data as skipping the elements from the beginning to the ending whereby while the image data remain single, respective movie files are prepared imaginarily.

Step (s1e) in the embodiment 1 essentially constitutes "a step for confirming that the image obtained in step (s1d) is at the maximum speed as a human motion".

Similarly even step (s2g) in the embodiment 2 essentially constitutes "a step which confirms that the image obtained in step (s2f) is at the maximum speed as human motion".

The following will explain in detail with regard to the "steps which confirm that the images thus obtained are at their maximum speed as human motion".

To confirm referring to the first motion elements that "the speed is the highest as human motion", for example, the following method can be mentioned.

In response to the contents of the working of said first kind of motion elements, human motions are analyzed. As an example there is mentioned a case where walking motion is working.

The definition regarding the highest speed in walking is that the speed where walking speed is gradually increased and legs are raised high from the ground to reach immediately before running motion, is highest.

The maximum speed of said walking working is near confirmation of a physical phenomenon as exemplified above, so that there exists a clear threshold value. The threshold value becomes to mechanically obtain the maximum speed by measuring as many trial runners as possible and collecting and analyzing the data. Moreover, if the basic data such as stature and weight of the trial runners are simultaneously recorded, it is also possible to calculate the maximum speed in the working place, reviewed from the average body type of the workers in that working place. Thus, the maximum speed as human motions can be calculated by the following matters (a) to (c):
(a) Analysis of working contents;
(b) Data accumulation of the maximum speed relative to the analyzed working; and
(c) Reference to the suitable data based on the data formed by said accumulation.

Further, the skilled men can confirm, in some cases, by their perception obtained through their long-term experience at the places of work, the maximum speed with certainty like reference to said database or with more certainty. It is thus considered that it is possible to confirm "the maximum speed as human motion" even by human experience similar to reference said database.

Furthermore, in any of the mechanical confirmation relied on database, the confirmation by the skilled men, and the confirmation by average men of experience, if the confirmation of "the maximum speed as human motion" is compared with the confirmation of "the average speed as human motion" it will be understood that the former is clearly accurate because of presence of threshold value. This difference is one face of materially showing the accuracy of the present invention.

Step (s3e) and step (s3f) in the third embodiment are "a step in which the image of said evaluation object data is compared with the image of the evaluated working step, and said evaluation value is varied until reaching the same speed in the situation of the first kind of same motion elements" and "a step of displaying said evaluation value at the time when the speed became the same in step (s3e)". As described hereunder said steps can be mechanically carried out.

A: Based on both the images of said evaluation object data and of the evaluated working steps, common and characteristic actions are analyzed by a computer.

B: In order that said characteristic actions may be coincided with the speed of the image of said evaluation object data is varied so as to be synchronized with computer. This synchronization increases its accuracy by repeating said movie suitably.

C: There is taken an average of increase and decrease of the speed of said evaluation object data performed to obtain said synchronization, the speed of the image of said evaluation object data is supposed to be 100%, and the result of the increase and decrease is indicated by percentage. Thus, it is possible to obtain said evaluation value mainly by the computer processing.

INDUSTRIAL FIELD OF THE INVENTION

The principal object of the present invention is to establish a standard time (standard working speed) requisite for carrying out the basic establishment in industrial production when the workers do industrial activities of enterprise. In particular, in order to achieve more than 200% working speed relative to the image of the determined standard working speed through only slight effort by the workers, setting of unsuitable standard working speed can be avoided; and through only maintenance of 100% working speed it is possible to avoid so high setting of the standard working speed as bringing about great fatigue to the workers and injuring their health.

On the other hand, it becomes possible to judge that if the image of the standard working speed is determined, how speedy (slow) the image of unknown working speed is relative to the standard working speed. Conventionally, the evaluation is made by calculating the speed by stopwatch for every motion element. According to the present invention, however, the image of the standard working speed and the image of the working by the workers of evaluation object are pictured on the same display, and the two moving images are adjusted until their agreement whereby it has become possible to obtain the ratio to a standard working speed. As a result, it is now possible to easily obtain workers' evaluation without relying on specially trained humans.

The invention claimed is:

1. A method of producing a movie of a working activity at an actual working speed and of setting a standard working speed for the working activity, said method comprising the steps of:
    obtaining data relying on an actual worker performing a human step of the working activity as a first set of motion elements that are moving images;
    obtaining data relying on a machine performing a machine step of the working activity as a second set of motion elements that are moving images;
    analyzing, using a computer, the first set of moving images and the second set of moving images;
    tentatively determining a standard working speed based on the first set of moving images and the second set of moving images thus analyzed;
    simulating a maximum working speed which a theoretical worker could realize by multiplying the first set of motion elements obtained by an operational accelerating number (x) using a computer;
    evaluating whether the tentatively determined standard working speed is proper or not proper based on the simulated maximum working speed; and
    setting a standard working speed based on a proper result obtained by the evaluation step.

2. The method according to claim 1, wherein the step of obtaining the first set of motion elements includes removing an erroneous motion element included in said first set of motion elements.

3. The method according to claim 1, wherein the step of tentatively determining a standard working speed includes multiplying the first set of motion elements from which the erroneous motion element was removed with magnification of a standardizing(s).

4. The method according to claim 1, wherein the first set of motion elements and the second set of motion elements comprise digital data, said digital data being used as evaluation object data, and the evaluation object data are selected to determine image data of a suitable standard working speed.

* * * * *